(12) United States Patent
Oukassi et al.

(10) Patent No.: US 9,312,561 B2
(45) Date of Patent: Apr. 12, 2016

(54) MICROBATTERY AND METHOD FOR MANUFACTURING A MICROBATTERY

(75) Inventors: Sami Oukassi, Saint-Egreve (FR); Nicolas Dunoyer, Grenoble (FR); Raphael Salot, Lans-en-Vercors (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 477 days.

(21) Appl. No.: 13/806,004

(22) PCT Filed: May 31, 2011

(86) PCT No.: PCT/FR2011/000322
§ 371 (c)(1),
(2), (4) Date: Dec. 20, 2012

(87) PCT Pub. No.: WO2011/161330
PCT Pub. Date: Dec. 29, 2011

(65) Prior Publication Data
US 2013/0095381 A1 Apr. 18, 2013

(30) Foreign Application Priority Data
Jun. 21, 2010 (FR) .................................. 10 02598

(51) Int. Cl.
*H01M 10/04* (2006.01)
*H01M 4/58* (2010.01)
(Continued)

(52) U.S. Cl.
CPC ........ *H01M 10/0436* (2013.01); *H01M 4/5805* (2013.01); *H01M 4/5815* (2013.01); *H01M 4/661* (2013.01); *H01M 4/662* (2013.01); *H01M 4/667* (2013.01); *H01M 6/40* (2013.01); *H01M 10/052* (2013.01); *H01M 10/0585* (2013.01); *H01M 4/0404* (2013.01);
(Continued)

(58) Field of Classification Search
CPC .................... H01M 4/0471; H01M 2010/0495
See application file for complete search history.

(56) References Cited

U.S. PATENT DOCUMENTS 5,350,645 A * 9/1994 Lake et al. ..................... 429/124
6,650,000 B2 11/2003 Ballantine et al.
(Continued)

FOREIGN PATENT DOCUMENTS

FR     2 901 639 A1    11/2007

OTHER PUBLICATIONS

Nov. 23, 2011 International Search Report issued in International Application No. PCT/FR2011/000322 (with translation).
(Continued)

*Primary Examiner* — Jeremiah Smith
(74) *Attorney, Agent, or Firm* — Oliff PLC

(57) ABSTRACT

A microbattery that includes, in succession starting from a first substrate: a first current collector, a first electrode, an electrolyte, a second electrode consisting of a solder joint, a second current collector and a second substrate. Additionally, a method for manufacturing a microbattery, which includes the following steps: forming a thin-film multilayer including, in succession from the first substrate, a first current collector, a first electrode, an electrolyte and a first metal film; forming a second current collector on a face of a second substrate; and forming a second electrode by soldering the first metal film and the second current collector together, said substrates being placed facing each other during assembly.

15 Claims, 4 Drawing Sheets

(51) Int. Cl.
*H01M 4/66* (2006.01)
*H01M 6/40* (2006.01)
*H01M 10/052* (2010.01)
*H01M 10/0585* (2010.01)
*H01M 4/04* (2006.01)
*H01M 4/38* (2006.01)
*H01M 4/485* (2010.01)
*H01M 4/505* (2010.01)
*H01M 4/525* (2010.01)
*H01M 10/0562* (2010.01)

(52) U.S. Cl.
CPC .............. *H01M 4/0471* (2013.01); *H01M 4/38* (2013.01); *H01M 4/485* (2013.01); *H01M 4/505* (2013.01); *H01M 4/525* (2013.01); *H01M 10/0562* (2013.01); *Y02E 60/122* (2013.01); *Y02P 70/54* (2015.11); *Y10T 29/4911* (2015.01); *Y10T 29/49108* (2015.01); *Y10T 29/49115* (2015.01); *Y10T 29/49213* (2015.01)

(56) References Cited

U.S. PATENT DOCUMENTS

| | | |
|---|---|---|
| 2002/0093029 A1 | 7/2002 | Ballantine et al. |
| 2004/0049909 A1* | 3/2004 | Salot et al. ................... 29/623.5 |
| 2004/0258984 A1 | 12/2004 | Ariel et al. |
| 2007/0139001 A1* | 6/2007 | Hahn ............................ 320/112 |
| 2007/0275300 A1 | 11/2007 | Salot et al. |
| 2008/0316020 A1* | 12/2008 | Robertson et al. ........ 340/539.12 |
| 2010/0243300 A1* | 9/2010 | Amin et al. ................... 174/257 |
| 2010/0319967 A1* | 12/2010 | Amin et al. ................... 174/257 |

OTHER PUBLICATIONS

Fouassier et al., "Conception of a Consumable Copper Reaction Zone for a NiTi/SnAgCu Composite Material," *Composites: Part A*, 2002, pp. 1391-1395, vol. 33.

Pu et al., "Electrodeposition of Sn—Cu Alloy Anodes for Lithium Batteries," *Electrochimica Acta*, Feb. 2005, pp. 4140-4145, vol. 50.

"Flip Chip Bonding," http://www.microbonding.com/fr/fc_fr.htm, Jun. 21, 2009.

\* cited by examiner

MICROBATTERY AND METHOD FOR MANUFACTURING A MICROBATTERY

BACKGROUND

The invention relates to a microbattery comprising an assembly of thin films successively forming, from a first substrate, a first current collector, a first electrode, an electrolyte, a second electrode, and a second current collector.

The invention also relates to a method for manufacturing a microbattery.

DISCUSSION OF THE RELATED ART

Microbatteries, also called "all solid-state" batteries, are formed of an active stack of thin solid films. The operating principle of such microbatteries is based on the insertion and the deinsertion, also called intercalation-deintercalation, of an alkaline metal ion or of a proton in at least one electrode. The main systems use the lithium cation ($Li^+$) as an ionic species. Indeed, lithium microbatteries are particularly advantageous due to their high mass density, to their high useful energy storage surface area, and to their low toxicity.

To protect the active stack of the microbattery, an encapsulation is generally performed to isolate the stack from external contact and to thus avoid any contamination from the environment.

Microbatteries have many industrial applications, especially in the field of microelectronics where the component miniaturization and autonomy needs impose the use of smaller, more powerful accumulators having longer lifetimes.

Improving the performances of microbatteries and the methods for manufacturing such microbatteries is a major issue in electronics, especially for the power supply of electronic components of integrated circuit such as chip cards, smart labels, or the power supply of internal clocks and microsystems. Such applications especially impose for all microbattery manufacturing steps to be compatible with industrial microelectronics processes to be able to easily integrate said microbatteries to electronic devices and, in particular, while avoiding any degradation of the integrated circuit electronic components.

To comply with the needs of microelectronics, many methods for manufacturing microbatteries have been provided in literature.

In particular, documents US-A-20040258984 and U.S. Pat. No. 6,650,000 provide forming a microbattery on the same substrate used for the electronic components of integrated circuit, such as microelectromechanical systems (MEMs), light-emitting diodes, or transistors. Manufacturing methods thus enable to integrate the microbattery and an integrated circuit in a same substrate. Certain manufacturing steps of the microbattery and of the components are common. Such a monolithic approach is commonly called "system on chip" (SOC). The SOC gathers on a same substrate components collectively formed by co-integration of different component manufacturing steps. Thus, such an approach has the advantage of gaining space and of promoting the miniaturization of devices. Further, the microbattery integration improves the reliability and the performances of the components and of the microbattery while decreasing system manufacturing costs as compared with an electronic device powered by an external battery.

In particular, document US-A-20040258984 describes the manufacturing of a microbattery comprising an electrode containing lithium, a silicon oxide electrolyte ($SiO_2$), and a counter-electrode according to techniques borrowed from the field of microelectronics, such as photolithography and etching.

Document US-A-20020093029 discloses a microbattery in an integrated circuit directly formed at the level of the interconnections relative to the integrated circuits, under one or several electronic components.

However, this monolithic approach is constraining since it imposes very high technological efficiencies and high production volumes, to amortize the co-integration cost. Further, the sizing and, more broadly, the architecture of the microbattery, are imposed by the co-integration. However, it is known that the microbattery sizing has an influence on the intrinsic properties of the microbattery, and in particular on its capacitance. This approach accordingly limits possible architectures and the sizing range of the microbattery.

Further, document US-A-2007275300 describes a microcomponent comprising first and second substrates attached to each other via sealing means. The sealing means are formed of an anisotropic conductive film ACF, of polymer type, that is, a film allowing a vertical electric conduction with respect to the film plane and an electric insulation in the film plane.

OBJECT OF THE INVENTION

The object of the invention is to form a microbattery and a method for manufacturing a microbattery overcoming the disadvantages of prior art.

In particular, the present invention aims at a microbattery having good electric performances and at a method for manufacturing a microbattery which is easy to implement, economically viable and compatible with the technologies used in microelectronics.

According to the present invention, this aim is achieved by arranging the assembly of thin films between the first substrate and a second substrate and by forming the second electrode with a solder joint which mechanically connects said first and second substrates.

According to the present invention, this aim is also achieved by a method for manufacturing a microbattery comprising the following steps of:

forming a stack of thin films on a first substrate comprising, in succession from the first substrate, a first current collector, a first electrode, an electrolyte, and a first metal film, forming a second current collector on a face of a second substrate, and forming a second electrode, said step of forming the second electrode comprising the assembly of said first and second substrates by soldering the first metal film and the second current collector by means of at least one solder ball previously deposited on a contact face of the first metal film or on a contact face of the second current collector, said first and second substrates being placed facing each other during the assembly.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF SPECIFIC EMBODIMENTS

According to a first embodiment shown in FIGS. 1 to 4, a method for manufacturing a microbattery comprises the formation according to any known method of a stack 1 of thin films on a first substrate 2. In particular, the thin films of the microbattery are successively deposited on the first substrate 2 by conventional techniques in microelectronics, especially by physical vapor deposition (PVD) or chemical vapor deposition (CVD). The thickness of the thin films typically varies between 0.1 μm and 10 μm.

Figure 1:
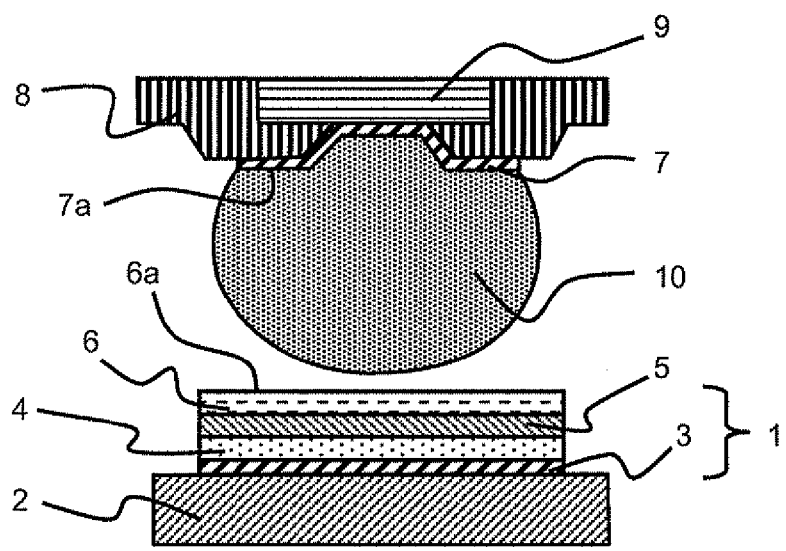
FIGS. 1 to 4 schematically show, in cross-section view, different steps of a method for manufacturing a microbattery according to a first specific embodiment of the present invention.

As shown in FIG. 1, starting from first substrate 2, stack 1 is formed, in succession, by a first current collector 3, a first electrode 4, an electrolyte 5, and a first metal film 6.

First substrate 2 conventionally is a silicon wafer or a silicon wafer containing an application specific integrated circuit (ASIC). First substrate 2 may also be covered with a passivation film (not shown) arranged under first current collector 3. The passivation film is typically formed by a dielectric such as silicon dioxide ($SiO_2$) or by a bilayer successively formed of a $SiO_2$ film and of a silicon nitride film ($Si_3N_4$).

First current collector 3 is conventionally metallic, for example, made of platinum (Pt), chromium (Cr), gold (Au), titanium (Ti), tungsten (W), molybdenum (Mo), nickel (Ni), or vanadium (V).

First electrode 4 generates $Li^+$ ions, that is, it comprises an active lithium intercalation material. The materials used as the active materials of first electrode 4 may be either non-lithiated materials such as, for example, copper sulfides or disulfides (Cu or $CuS_2$), tungsten oxysulfides ($WO_yS_z$), titanium disulfides ($TiS_2$), titanium oxysulfides ($TiO_xS_y$), or vanadium oxides ($V_xO_y$) or lithiated materials such as, for example, mixed lithium-based oxides such as lithium cobalt oxide ($LiCoO_2$), lithium nickel oxide ($LiNiO_2$), lithium manganese oxide ($LiMn_2O_4$), lithium vanadium pentoxide ($LiV_2O_5$), or lithium iron phosphate ($LiFePO_4$).

Electrolyte 5 is formed of a material allowing the conduction of ions, preferably, lithium ions $Li^+$. Electrically-insulating and ionic conductive materials will preferably be selected. Electrolyte 5 is preferably a lithium-based compound such as a lithium phosphorous oxynitride (LiPON) or a nitrogen-incorporated lithium silicophosphate (LiSiPON).

As shown in FIG. 1, the manufacturing method also comprises a step of forming a second current collector 7 on a surface of a second substrate 8. This step is carried out independently from the above-described step of forming the stack 1, that is, before or after the step of forming the stack 1.

Second substrate 8 is different and independent from first substrate 2. Second substrate 8 preferably comprises at least one electronic component 9 intended to be electrically connected to the microbattery. Second substrate 8 may, like substrate 2, be formed by a silicon wafer or a silicon wafer containing one or several electronic components of an integrated circuit. Second substrate 8 may comprise a passivation film (not shown) located between second substrate 8 and second current collector 7.

A solder ball 10 is then deposited on a contact face 7a of second current collector 7. Solder ball 10 is formed on second current collector 7, according to any known method (FIG. 1), so as to form a protrusion or bump at the surface of second substrate 8 (FIG. 1).

Second current collector 7 advantageously presents a good adhesion to the second substrate 8, has a good wettability with respect to the materials forming solder ball 10 and low internal mechanical stresses.

Second current collector 7 preferably comprises a second metal film provided with contact surface 7a having solder ball 10 formed thereon.

The second metal film is advantageously different from first metal film 6, to avoid any interdiffusion of metallic species between the solder ball 10 and the second metal film.

The second metal film forms a metallized film so-called UBM or "Under Bump Metallization" promoting the bonding of the solder ball 10 to second substrate 8 or the passivation film of second substrate 8. Further, the second metal film preferably forms a barrier against the diffusion of species involved in the electrochemical reactions occurring in the microbattery, and in particular against $Li^+$ ions.

The second metal film is preferably made of one or several metals selected from among Pt, Cr, Au, Ti, W, Mo, Ni, or V and alloys thereof.

The second metal film may be a multilayer formed of several stacked metal films to obtain adequate mechanical properties.

As shown in FIG. 1, it is possible for second current collector 7 to only be made of the second metal film.

In stack 1, first metal film 6 is preferably made of a metal selected from among copper, tin, and a copper-tin alloy.

As a variation, first metal film 6 may be formed of a stack of metal-based films. One of the films in the stack is provided with a contact face 6a (top face in FIG. 1), intended to be in contact with the solder ball 10, and is made of a metal selected from among copper, tin, and a copper-tin alloy.

Solder ball 10 is made of a material different from the material of first metal film 6.

Solder ball 10 is made of an electrically conductive material advantageously selected from among alloys of tin (Sn), silver (Ag), indium (In), gold (Au) and/or copper (Cu), preferably from among SnAgCu, AuSn, SnCu, and AgIn alloys.

The next step of the method for manufacturing a microbattery is to form a second electrode 11. This step comprises the assembly of the first and second substrates, respectively 2 and 8, by soldering of first metal film 6 and of second current collector 7, by means of at least the solder ball 10. "Assembly" here means a permanent assembly which mechanically connects the first and second substrates, respectively 2 and 8.

The mechanical assembly used is similar to a connection known as flip-chip, where the surfaces to be connected are assembled face to face rather than side by side as for a conventional wire bonding. This assembly is remarkable in that it optimizes the volume and does not require saving additional surface area of second substrate 8 for the bonding.

First and second substrates, respectively 2 and 8, are arranged face to face during the assembly so as to place the solder ball 10 in contact with the first metal film 6.

Thus, solder ball 10 of second substrate 8 is placed in front of stack 1 of first substrate 2 so that solder ball 10 is placed in front of first metal film 6.

Figure 2:
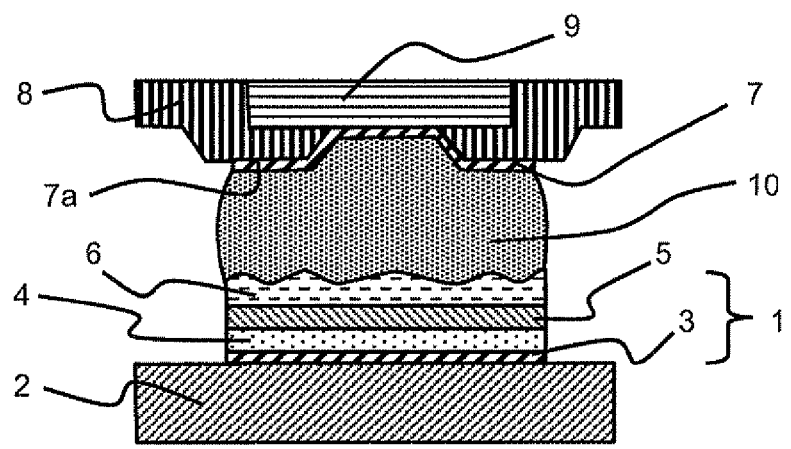
Figure 3:
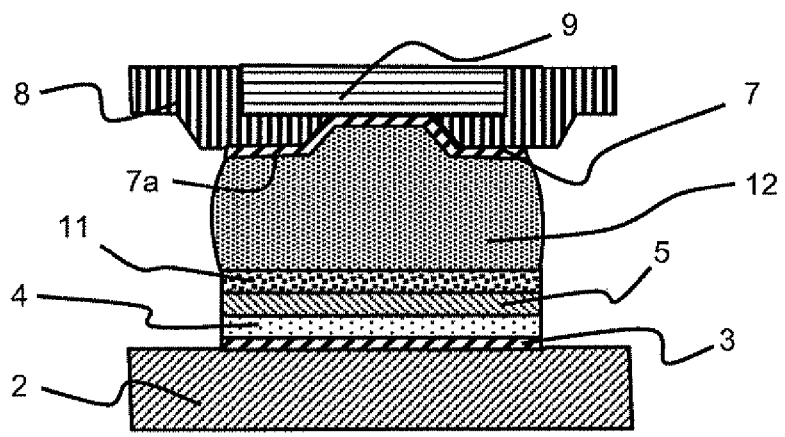

As shown in FIGS. 2 and 3, a step of remelting of solder ball 10 is carried out simultaneously to the contacting. The remelting step preferably is a thermal treatment. The thermal treatment may be performed by using a remelting furnace.

As shown in FIG. 2, the remelting initially causes the interdiffusion of metal species from the solder ball 10 and the first metal film 6, at the level of their interface. "Metallic species" is used to designate metallic elements, loaded or not, for example, in the form of intermetallic compounds.

The remelting of solder ball 10 promotes the migration of the metal species from solder ball 10 into first metal film 6.

The thermal treatment and the migration of the metal species induce chemical reactions at the interface between the solder ball 10 and the first metal film 6 to form new intermetallic compounds.

As shown in FIG. 3, interfacial reactions form an intermetallic film at the interface between solder ball 10 and first metal film 6, which then forms second electrode 11.

Thus, second electrode 11 is formed during the assembly step by remelting of solder ball 10. Second electrode 11 is formed by a solder joint formed by at least one intermetallic compound resulting from the interdiffusion of the metallic species of solder ball 10 and of the first metal film 6.

Solder ball 10 may be partially consumed during this assembly step to form second electrode 11 and an electrically conductive film 12 between second current collector 7 and second electrode 11. Electrically conductive film 12 is then formed by the portion of the solder ball 10, which has not reacted with the first metal film 6.

Electrically conductive film 12 is made of the same material as solder ball 10.

Further, the solder joint forming second electrode 11 mechanically connects the first and second substrates, respectively 2 and 8.

The soldering step thus enables to form second electrode 11 and to assemble the first and second substrates, respectively 2 and 8.

The parameters of the thermal treatment depend on the nature of the materials of first metal film 6, of second current collector 7 and of solder ball 10. In particular, the duration of the temperature-holding period is determined according to the desired thickness of second electrode 11. The parameters of the thermal treatment of the solder step, especially the thermal treatment time, enable to control the thickness of the intermetallic film formed.

As an example, a first copper metal film 6 and a solder ball 10 made of a SnAgCu alloy may be used. The SnAgCu alloy corresponds to a known eutectic structure comprising 95.5% of Sn, 3.8% of Ag, and 0.7% of Cu and made of intermetallic compounds $Cu_6Sn_5$ and $Ag_3Sn$ dispersed in an Sn matrix.

The thermal treatment may be performed at a temperature ranging from 170° C. to 260° C., with a duration of the temperature-holding period ranging between 1 min and 5 min. The thermal treatment may also comprise several temperature stages, between 170° C. and 260° C.

As shown by Fouassier et al. in article "Conception of a consumable copper reaction zone for a NiTi/SnAgCu composite material" (Composites, Part A 33 (2002) 1391-1395), a Sn—Cu intermetallic film is obtained by remelting of the SnAgCu alloy on a copper film.

Further, Fouassier et al. show that the composition and the thickness of the Sn—Cu intermetallic film especially depend on the duration of the temperature-holding period, at constant temperature.

Second electrode 11 is made of at least one intermetallic copper and tin compound resulting from the interdiffusion between the solder ball 10 and the first metal film 6. In particular, the second electrode 11 is made of intermetallic compounds $Cu_6Sn_5$ and/or $Cu_3Sn$ which appear to be active as microbattery electrode materials and which are set forth in the art as a promising alternative to conventional lithium insertion materials.

Indeed, in the article "Electrodeposition of Sn—Cu alloy anodes for lithium batteries" Weihua et al. describes works carried out on an electrode made of an Sn—Cu alloy. Weihua et al. shows that an electrode made of intermetallic Sn—Cu compounds has a good performance, especially in terms of charge and discharge capacity and in terms of cycling resistance.

The above-described manufacturing method thus enables to obtain a microbattery comprising an assembly of thin films arranged between the first and second substrates, respectively 2 and 8, successively forming from a first substrate 2, a first current collector 3, a first electrode 4, an electrolyte 5, a second electrode 11 formed by the solder joint, and a second current collector 7 (FIG. 3).

The microbattery may also comprise an electrically conductive film 12 between second electrode 11 and second current collector 7.

Second current collector 7, advantageously formed by the second metal film, enables to electrically connect electronic component 9 integrated in second substrate 8.

Second electrode 11 ensures the mechanical connection between the first and second substrates, respectively 2 and 8.

Second electrode 11 made of at least one intermetallic compound has a small volume expansion and ensures the mechanical strength of the microbattery.

Figure 4:
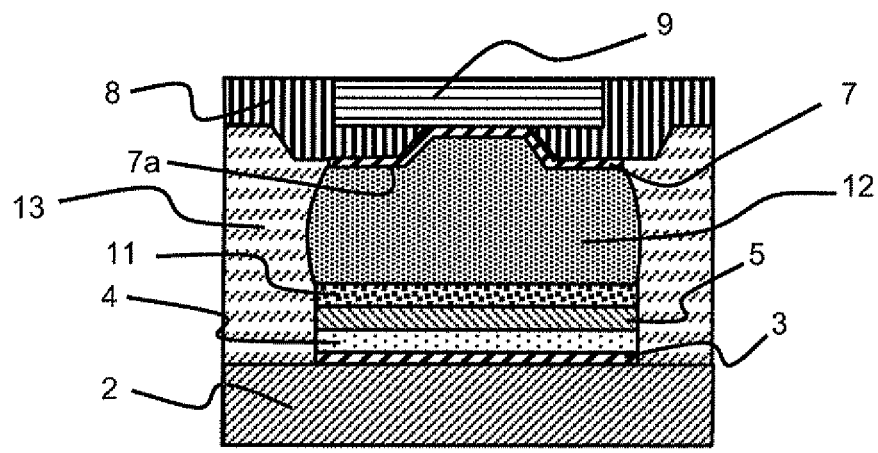

As shown in FIG. 4, the step of forming the second electrode 11 is followed by a step of encapsulation of the microbattery according to any known method. The microbattery is encapsulated by an encapsulation film 13 which is inert with respect to the elements forming the microbattery. Encapsulation film 13 is intended to seal the microbattery and to protect it against external contamination. Encapsulation film 13 is made of a semiconductor encapsulation resin or of a resin called "underfill", used for flip-chip type connections.

Encapsulation film 13 is preferably made of a composite epoxide-based resin, loaded with amorphous silica grains. The inclusion of amorphous silica in this type of resin increases its general stiffness, decreases the coefficient of thermal expansion, and provides a greater resistance to the formation of internal humidity.

Figure 5:
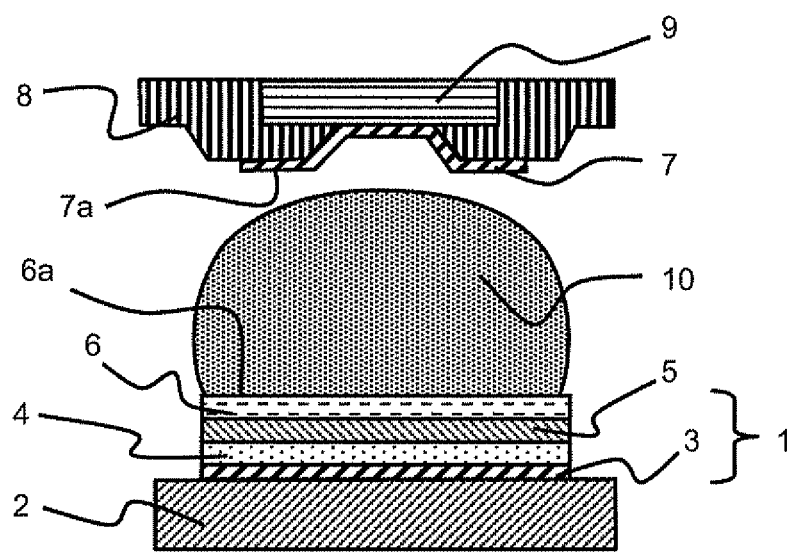
FIG. 5 schematically shows, in cross-section view, a variation of the manufacturing method according to the first specific embodiment of the present invention.

According to a variation shown in FIG. 5, the manufacturing method differs from the first specific embodiment in that the solder ball 10 is deposited, prior to the assembly step, on the contact face contact 6a of first metal film 6 instead of on the contact face contact 7a of second current collector 7.

The assembly of the first and second substrates, respectively 2 and 8, is then carried out by placing solder ball 10 in contact with contact face 7a of second current collector 7 and by remelting solder ball 10. The other steps are identical to those of the first embodiment described hereabove.

According to another variation, not shown, the microbattery comprises a third electrode arranged between the electrolyte 5 and the second electrode 11. The method for manufacturing such a microbattery is identical to the first above-described embodiment, but for the fact that a stack 1 comprising, in succession starting from the first substrate 2, the first current collector 3, the first electrode 4, the electrolyte 5, the third electrode, and first metal film 6 is initially formed.

Figure 6:
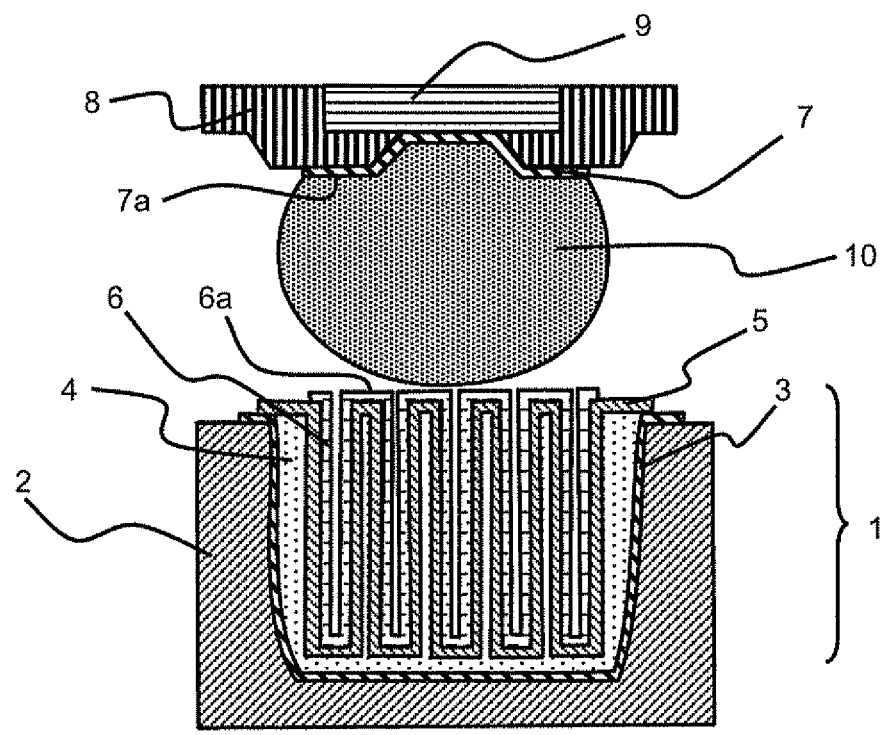
FIGS. 6 to 8 schematically show, in cross-section view, different steps of a method for manufacturing a microbattery according to a second specific embodiment of the present invention.
Figure 7:
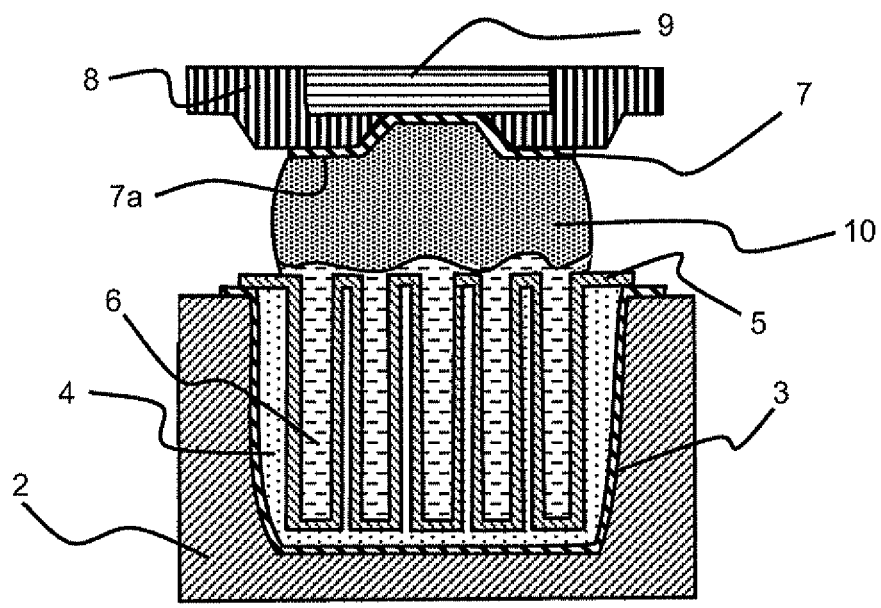
Figure 8:
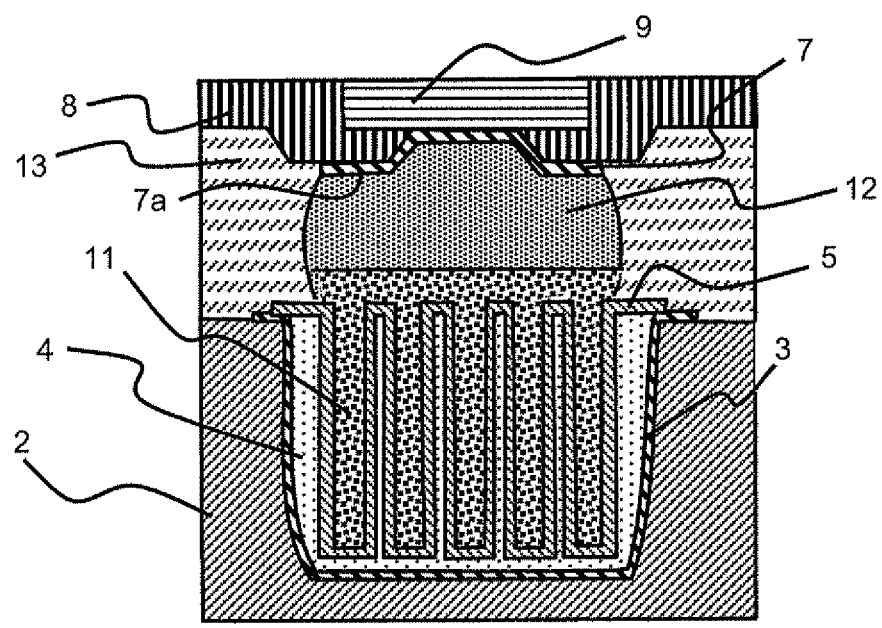

According to a second embodiment shown in FIGS. 6 to 8, the method for manufacturing a microbattery is identical to the first above-described embodiment but for the fact that the microbattery has a non-planar architecture.

As shown in FIG. 6, first substrate 2 is textured. Patterns, for example, trenches, are thus created at the surface of first substrate 2 before forming stack 1 by successive deposition of thin films on first substrate 2. Stack 1 comprises in succession from first substrate 2, the first current collector 3, the first electrode 4, the electrolyte 5 and the first metal film 6. First metal film 6 forms at the surface of stack 1 (at the top of FIG. 6) metal tracks forming contact surface 6a.

Second substrate 8 comprises second current collector 7 and solder ball 10 is formed in the same way as for the first above-described embodiment on contact face 7a.

As shown in FIG. 7, solder ball 10 of second substrate 8 is aligned with metal tracks 6a, and then placed in contact with metal tracks 6a.

The first and second substrates, respectively 2 and 8, are assembled by soldering the first metal film 6 and the second current collector 7, according to a method identical to that previously described.

The patterns formed in first substrate 2 are preferably filled by remelting of solder ball 10 and of first metal film 6 (FIG. 7).

As shown in FIG. 8, second electrode 11 is formed during the assembly step of the method, after which the microbattery thus formed is encapsulated in the same way as for the first specific embodiment.

The non-planar architecture increases the microbattery performance. The texturing of the surface of first substrate 2 enables to increase the contact surface area between electrolyte 5 and the first and second electrodes, respectively 4 and 11. Such a non-planar configuration promotes ion exchanges and accordingly improves the microbattery capacity.

The present invention is not limited to the embodiments described hereabove as non-limiting examples. In particular, the soldering may be performed by means of several solder balls 10 according to any known method.

The manufacturing method according to the present invention is easy to implement and is compatible with technologies implemented in microelectronics. Typically, the manufacturing method enables to incorporate at a low cost a microbattery in an integrated circuit, especially to power a microcomponent of such an integrated circuit.

Unlike manufacturing methods of the prior art, the fact of using two substrates in the manufacturing method provides the possibility of manufacturing microbatteries of various sizes and of increasing possibilities of compatibility with the manufacturing steps of integrated circuit.

The manufacturing method according to the present invention involves manufacturing steps that may be shared with those of microcomponents to be integrated in substrates. Further, the manufacturing method enables to consider collective manufacturing modes and a connection between several microbatteries.

Further, microbatteries according to the present invention have a high electric performance, especially due to a face-to-face assembly of the substrates, which induces a decrease in the length of electric tracks connecting the microbattery to the microcomponents and, accordingly, a decrease in noise and parasitic signals.

The invention claimed is:

1. A method for manufacturing a microbattery comprising the following steps of:
    forming a stack of thin films on a first substrate comprising, successively, starting from the first substrate, a first current collector, a first electrode, an electrolyte, and a first metal film,
    forming a second current collector on a face of a second substrate, and
    forming a second electrode, said step of forming the second electrode comprising an assembly step of said first and second substrates by soldering the first metal film and the second current collector together using a solder ball previously deposited on a contact face of the first metal film or on a contact face of the second current collector, said first and second substrates being placed facing each other during the assembly step, so as to obtain the second electrode formed by a solder joint comprising at least one intermetallic compound resulting from an interdiffusion of a metallic species of the solder ball and of the first metal film.

2. The method according to claim 1, wherein the second current collector comprises a second metal film, said second metal film forming the contact face of the second current collector.

3. The method according to claim 1, wherein the second electrode is formed during the assembly step by remelting the solder ball.

4. The method according to claim 1, wherein the solder ball is partially consumed during said soldering so as to form the second electrode and an electrically conductive film between the second current collector and the second electrode, said electrically conductive film being made of the material forming the solder ball.

5. The method according to claim 1, wherein the solder ball is made of an electrically conductive material selected from among alloys of tin, silver, indium, gold and/or copper.

6. The method according to claim 5, wherein the solder ball is made of an electrically conductive material selected from among SnAgCu, AuSn, AgIn, and SnCu alloys.

7. The method according to claim 1, wherein the first metal film is made of a metal selected from among copper, tin, and a copper-tin alloy.

8. The method according to claim 7, wherein the assembly of the first and second substrates comprises placing the solder ball in contact with the first metal film and remelting the solder ball by thermal treatment.

9. The method according to claim 1, wherein the first metal film is made of a stack of metal-based films and wherein one of said metal-based films is provided with the contact face intended to be in contact with the solder ball and is made of a metal selected from among copper, tin, and a copper-tin alloy.

10. The method according to claim 1, wherein the first metal film is made of copper and the solder ball is made of an SnAgCu alloy and in that the thermal treatment is carried out at a temperature ranging between 170° C. and 260° C.

11. The method according to claim 1, wherein the second substrate comprises at least one electronic component.

12. The method according to claim 1, wherein the step of forming the second electrode is followed by a step of encapsulation of the microbattery.

13. A microbattery successively comprising: a first substrate, a thin film first current collector, a thin film first electrode, a thin film electrolyte, a second electrode, a first electrically conductive film comprising a solder material, a second thin film current collector, and a second substrate;
    the second electrode comprising an intermetallic compound layer formed by at least one intermetallic compound resulting from an interdiffusion of a metallic species of the first electrically conductive film and of a first metal film and ensuring a mechanical connection between the first substrate and the second substrate.

14. The microbattery according to claim 13, wherein an electrically conductive film is disposed between the second electrode and the second current collector.

15. The microbattery according to claim 13, wherein the second substrate comprises at least one electronic component.

* * * * *